US006863719B2

(12) United States Patent
Butler et al.

(10) Patent No.: US 6,863,719 B2
(45) Date of Patent: Mar. 8, 2005

(54) INK JET INK WITH IMPROVED RELIABILITY

(75) Inventors: Susan H. Butler, Lexington, KY (US); Meagan C. Winkler, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 62 days.

(21) Appl. No.: 10/334,155

(22) Filed: Dec. 30, 2002

(65) Prior Publication Data

US 2004/0123773 A1 Jul. 1, 2004

(51) Int. Cl.$^7$ .......................... C09D 11/00; C09D 11/02
(52) U.S. Cl. ..................... 106/31.28; 106/31.48; 106/31.49; 106/31.52; 106/31.6
(58) Field of Search ..................... 106/31.28, 31.48, 106/31.49, 31.52, 31.6

(56) References Cited

U.S. PATENT DOCUMENTS

| 4,723,129 | A | 2/1988 | Endo et al. |
| 5,100,469 | A | 3/1992 | Pontes et al. |
| 5,451,251 | A | 9/1995 | Mafune et al. |
| 5,580,372 | A | 12/1996 | Gino et al. |
| 5,604,276 | A | 2/1997 | Suga |
| 5,672,198 | A | 9/1997 | Belmont |
| 5,725,643 | A | 3/1998 | Higashiyama |
| 5,735,941 | A | 4/1998 | Feeman et al. |
| 5,760,124 | A | 6/1998 | Listigovers et al. |
| 5,788,750 | A | 8/1998 | Gundlach et al. |
| 5,814,138 | A | 9/1998 | Fague |
| 5,837,043 | A | 11/1998 | Wong et al. |
| 5,847,026 | A | 12/1998 | Kitahara et al. |
| 5,859,092 | A | 1/1999 | Hirasa et al. |
| 5,861,447 | A | 1/1999 | Nagasawa et al. |
| 5,863,320 | A | 1/1999 | Breton et al. |
| 5,874,974 | A | 2/1999 | Courian et al. |
| 5,885,335 | A | 3/1999 | Adams et al. |
| 5,885,336 | A | 3/1999 | Kitahara et al. |
| 5,891,231 | A | 4/1999 | Gnerlich et al. |
| 5,891,232 | A | 4/1999 | Moffatt et al. |
| 5,922,118 | A | 7/1999 | Johnson et al. |
| 5,925,692 | A | 7/1999 | Kappele et al. |
| 5,938,827 | A | 8/1999 | Breton et al. |
| 5,946,012 | A | 8/1999 | Courian et al. |
| 5,964,930 | A | 10/1999 | Saibara et al. |
| 5,969,003 | A | 10/1999 | Foucher et al. |
| 5,969,005 | A | 10/1999 | Yamashita et al. |
| 5,972,087 | A | 10/1999 | Uraki et al. |
| 5,973,025 | A | 10/1999 | Nigam et al. |
| 5,973,026 | A | 10/1999 | Burns et al. |
| 5,976,230 | A | 11/1999 | Askeland et al. |
| 5,976,233 | A | 11/1999 | Osumi et al. |
| 5,977,207 | A | 11/1999 | Yui et al. |
| 5,977,209 | A | 11/1999 | Breton et al. |
| 5,981,623 | A | 11/1999 | McCain et al. |
| 5,993,524 | A | 11/1999 | Nagai et al. |

| 6,004,389 | A | 12/1999 | Yatake |
| 6,020,397 | A | 2/2000 | Matzinger |
| 6,022,403 | A | 2/2000 | Kuo |
| 6,033,466 | A | 3/2000 | Ito |
| 6,034,153 | A | 3/2000 | Tsang et al. |
| 6,036,759 | A | 3/2000 | Wickramanayake et al. |
| 6,048,389 | A | 4/2000 | Price et al. |
| 6,059,869 | A | 5/2000 | Fassler et al. |
| 6,063,536 | A | 5/2000 | Ikeyama et al. |
| 6,063,834 | A | 5/2000 | Kappele et al. |
| 6,069,190 | A | 5/2000 | Bates et al. |
| 6,075,069 | A | 6/2000 | Takemoto |
| 6,086,661 | A | 7/2000 | Malhtra et al. |
| 6,099,632 | A | 8/2000 | Nagasawa et al. |
| 6,103,780 | A | 8/2000 | Matzinger et al. |
| 6,117,222 | A | 9/2000 | Nigam et al. |
| 6,132,502 | A | 10/2000 | Yatake |
| 6,143,807 | A | 11/2000 | Lin et al. |
| 6,152,999 | A | 11/2000 | Erdtmann et al. |
| 6,153,000 | A | 11/2000 | Erdtmann et al. |
| 6,171,382 | B1 | 1/2001 | Stubbe et al. |
| 6,174,355 | B1 | 1/2001 | Mayo et al. |
| 6,180,691 | B1 | 1/2001 | Cheng et al. |
| 6,184,268 | B1 | 2/2001 | Nichols et al. |
| 6,211,265 | B1 | 4/2001 | Ohta et al. |
| 6,221,141 | B1 | 4/2001 | Takada et al. |
| 6,231,156 | B1 | 5/2001 | Ono |
| 6,245,832 | B1 | 6/2001 | Suzuki et al. |
| 6,248,163 | B1 | 6/2001 | Martin |
| 6,254,669 | B1 | 7/2001 | Lavery et al. |
| 6,254,670 | B1 | 7/2001 | Erdtmann et al. |
| 6,261,353 | B1 | 7/2001 | Doi et al. |

(List continued on next page.)

FOREIGN PATENT DOCUMENTS

| EP | 1035177 A1 | 3/2000 |
| EP | 0997288 A2 | 5/2000 |
| EP | 0997288 A3 | 7/2000 |
| EP | 1035178 A2 | 9/2000 |
| EP | 1120446 A1 | 8/2001 |
| JP | 10324818 | 12/1998 |
| JP | 11199810 | 7/1999 |
| JP | 1134309 | 12/1999 |
| JP | 200017192 | 1/2000 |
| JP | 20000017191 | 1/2000 |
| JP | 2000181355 | 3/2001 |

Primary Examiner—Helene Klemanski
(74) Attorney, Agent, or Firm—Kilpatrick Stockton LLP; John A. Brady

(57) ABSTRACT

An ink composition comprising: a self-dispersing carbon black, a binder, a stabilizing dye comprising at least as many groups comprising $CO_2H$ or $COSH$ as groups comprising $SO_3H$, and an aqueous vehicle. The stabilizing dye can improve the reliability and performance of the ink composition. The addition of the stabilizing dye can reduce or prevent the formation of material that blocks the printhead vias and throats as a result of the presence of a binder in the ink. The ink composition can reduce the amount of maintenance needed to retain all of a printhead's nozzles through the life of the printhead.

40 Claims, No Drawings

U.S. PATENT DOCUMENTS

| | | |
|---|---|---|
| 6,277,183 B1 | 8/2001 | Johnson et al. |
| 6,299,675 B1 | 10/2001 | Ono et al. |
| 6,306,204 B1 | 10/2001 | Lin |
| 6,315,853 B1 | 11/2001 | Kubota et al. |
| 6,322,183 B1 | 11/2001 | Kubota et al. |
| 6,328,393 B1 | 12/2001 | Lin et al. |
| 6,332,919 B2 | 12/2001 | Osumi et al. |
| 6,471,757 B1 * | 10/2002 | Koitabashi et al. ...... 106/31.28 |
| 6,550,904 B2 * | 4/2003 | Koitabashi et al. ......... 347/100 |
| 2001/0002558 A1 | 6/2001 | Sano et al. |
| 2001/0003511 A1 | 6/2001 | Tawa et al. |
| 2001/0004517 A1 | 6/2001 | Gugel et al. |
| 2001/0045975 A1 * | 11/2001 | Katsuragi et al. ............. 347/64 |
| 2002/0000293 A1 | 1/2002 | Hill, IV et al. |
| 2002/0000453 A1 | 1/2002 | Selby |
| 2002/0196303 A1 * | 12/2002 | Koitabashi et al. ........... 347/21 |
| 2003/0048342 A1 * | 3/2003 | Kashiwazaki et al. ...... 347/100 |
| 2003/0101900 A1 * | 6/2003 | Thakkar et al. ............ 106/31.6 |

* cited by examiner

INK JET INK WITH IMPROVED RELIABILITY

TECHNICAL FIELD

The present invention relates generally to ink employed in ink jet printing. More particularly, it is directed to inks that use a dye to improve the stability of a pigment dispersion.

BACKGROUND OF THE INVENTION

Ink jet printing is accomplished by ejecting ink from a nozzle toward paper or another print medium. The ink is driven from the nozzle toward the medium in a variety of ways. For example, in electrostatic printing, the ink is driven by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

The composition of the ink is traditionally comprised of deionized water, a water soluble organic solvent, and a colorant. The colorant may be a soluble dye or insoluble pigment. Several problems, however, are associated with soluble dyes that are not applicable to insoluble pigments. These problems include poor water-fastness, poor light-fastness, poor thermal stability, facile oxidation, dye crystallization, and ink bleeding and feathering on the print medium. To circumvent these problems, use of a pigment as the colorant is preferred. Pigments generally have better light-fast and water-fast properties, are more resistant to oxidation, and have higher thermal stability.

Pigment based inks have some disadvantages as compared to dye-based inks. Due to the insolubility of pigments in water, polymeric dispersants and/or surfactants are typically added to improve the dispersibility of the pigment. The addition of a polymeric dispersant can increase the viscosity of an ink and decrease its wetting ability. A viscous ink is more difficult to jet in a printhead.

Further, pigment based inks typically have increased dry time and reduced smear resistance as compared to dye based inks. Due to their size, pigment particles rest on the surface of the printed media as opposed to dyes, which penetrate into the media. As a result, pigment based inks require more time to dry before being handled to reduce image distortion.

To reduce smearing due to handling or highlighters, materials such as acrylic polymer resins have been added to pigment based inks. The acrylic polymer resins bind the pigment to the printed media. These resins can improve fixation of the pigmented inks to media, but they may simultaneously reduce the reliability and stability of the inks. For example, pigmented inks containing binder resins can cause the formation of ink material that blocks the vias and throats of a printhead.

Thus, there is a need for pigment based inks with improved smear resistance and improved reliability.

SUMMARY OF THE INVENTION

The present invention provides an ink composition comprising: a self-dispersing carbon black, a binder, a stabilizing dye comprising at least as many groups comprising $CO_2H$ or $COSH$ as groups comprising $SO_3H$, and an aqueous vehicle. The ink composition has improved reliability and performance. The addition of the stabilizing dye can reduce or prevent the formation of material that blocks the printhead vias and throats as a result of the presence of a binder in the ink. The ink composition has greater permanence and can reduce the amount of maintenance to retain all of a printhead's nozzles through the life of the printhead.

DETAILED DESCRIPTION

Pigment based inks typically have increased dry time and reduced smear resistance as compared to dye based inks. Due to their size, the pigment particles rest on the surface of the printed media as opposed to dyes, which penetrate into the media. As a result, pigment based inks require more time to dry before being handled to reduce image distortion. To reduce smearing due to handling or highlighters, materials such as acrylic polymer resins have been added to pigment based inks. The acrylic polymer resins bind the pigment to the printed media. These resins can improve fixation of the pigmented inks to media, but they may simultaneously reduce the reliability and stability of the inks. For example, pigmented inks containing binder resins can cause the formation of ink material that blocks the vias and throats of a printhead.

It has been discovered that the addition of various stabilizing dyes to pigmented inks containing a binder can improve the reliability and performance of the ink in an ink jet printhead. The ink composition of the present invention comprises: a self-dispersing carbon black, a binder, a stabilizing dye comprising at least as many groups comprising $CO_2H$ or $COSH$ as groups comprising $SO_3H$, and an aqueous vehicle. The addition of the stabilizing dye can reduce or prevent the formation of material that blocks the printhead vias and throats as a result of the presence of a binder in the ink.

In an embodiment, the ink composition comprises about 0.1 to about 20.0% by weight of self-dispersing carbon black. In another embodiment, the ink composition comprises from about 1.0 to about 10.0% by weight of self-dispersing carbon black. In another embodiment, the ink composition comprises from about 1.0 to about 5.0% by weight of self-dispersing carbon black. In another embodiment, the self-dispersing carbon black has an oxygen content of less than or equal to about 10% by weight.

In an embodiment, the amount of stabilizing dye in the ink composition ranges from about 0.1 to about 10% by weight. In another embodiment, the amount of stabilizing dye in the ink composition ranges from about 0.1 to about 5% by weight. In another embodiment, the amount of stabilizing dye in the ink composition ranges from about 0.1 to about 1% by weight.

The ratio of self-dispersing carbon black to stabilizing dye in the ink composition ranges from about 100:1 to about 1:1, depending upon the self-dispersing carbon black that is employed. In an embodiment, the ratio of self-dispersing carbon black to stabilizing dye ranges from about 20:1 to about 1:1. In another embodiment, the ratio of self-dispersing carbon black to stabilizing dye ranges from about 10:1 to about 1:1. In another embodiment, the ratio of self-dispersing carbon black to stabilizing dye ranges from about 6:1 to about 1:1.

In an embodiment, the amount of binder included in the ink composition may range from about 0.1 to about 10% by weight. In another embodiment, the amount of binder in the ink composition ranges from about 1 to about 5% by weight.

Often the ink composition has a pH greater than or equal to 7. In an embodiment, the pH of the ink composition is greater than or equal to 7.5. In another embodiment, the pH of the ink composition is greater than or equal to 7.5 and less than or equal to 11.0 The pH can be obtained by adding either a base or an acid to the ink as necessary to adjust the pH. Appropriate acids and bases are well known in the art. Should it be necessary to add a base, the base preferably is potassium hydroxide. Should it be necessary to add an acid, the acid preferably is glycolic acid and acetic acid.

The self-dispersing carbon blacks used in the ink compositions of the present invention comprise carbon black that has been subjected to surface treatment to bond at least one functional group selected from the group consisting of carbonyl, carboxyl, hydroxyl, and sulfonyl groups or a salt thereof onto the surface thereof, permitting the pigment to be dispersed and/or dissolved in water without the aid of any dispersant. Specifically, such a pigment may be prepared by grafting the functional group or a molecule containing the functional group onto the surface of carbon black by physical treatment, such as treatment using vacuum plasma, or chemical treatment. A single kind of the functional group or a plurality of kinds of the functional groups may be grafted onto one carbon black particle.

In an embodiment, a self-dispersing carbon black contained in the ink compositions of the present invention may be obtained by a wet-oxidation treatment of carbon black using a hypohalous acid and/or salt thereof, according to the methods described in U.S. Pat. Nos. 2,439,442, and 3,347,632. The carbon black which is used as a raw material for the self-dispersing carbon black is generally a carbon powder which is obtained by thermal decomposition or incomplete combustion of a natural gas and liquid hydrocarbon (heavy oil, tar and the like). These are classified into channel black, furnace black, lamp black and the like depending on the production method, and are commercially available.

Specific examples of carbon black that can be used as starting material for preparing a self-dispersing carbon black include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600, MCF88 and the like manufactured by Mitsubishi Kagaku K.K.; Monarch® 120, Monarch® 700, Monarch® 800, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R and the like manufactured by Cabot K.K.; Printex® A, Printex® G, Printex® U, Printex® V, Printex® 55, Printex® 140U, Printex® 140V, Special black 4, Special black 4A, Special black 5, Special black 6, Special black 100, Special black 250, Color black FW1, Color black FW2, Color black FW2V, Color black FW18, Color black FW200, Color black S150, Color black S160, Color black S170 and the like manufactured by Degussa K.K.

The kind of the carbon black used as a raw material is not particularly restricted. Any of the above-described acidic carbon black, neutral carbon black and alkaline carbon black can be used.

Such carbon black can be wet-oxidized in water using a hypohalous acid and/or salt thereof. Specific examples of a hypohalous acid and/or salt thereof include sodium hypochlorite and potassium hypochlorite, and sodium hypochlorite is preferable from the viewpoint of reactivity.

The self-dispersing carbon black may then be purified using separating membranes having fine pores, such as reverse osmosis membrane and ultrafiltration membrane. The self-dispersing carbon black may also be concentrated so that a concentrated pigment dispersion is obtained in which the self-dispersing carbon black content is from about 10 to about 30% by weight.

There is essentially no limitation to additional pigments which may be employed in the ink compositions of the present invention. The additional pigments can be black, cyan, magenta, yellow, red, blue, green, brown, and mixtures thereof. Typical examples of additional pigments which may be used in the present invention include dye lakes, azo pigments including condensed azo pigments, and chelate azo pigments; polycyclic pigments, such as phthalocyanine pigments, anthraquinone pigments, quinacridone pigments, dioxazine pigments, thioindigo pigments, isoindolinone pigments, and quinophthalone pigments. Other pigments include nitro pigments, nitroso pigments and daylight fluorescent pigments as well as titanium dioxide, iron oxide, aniline black and carbon black. Preferred pigments for use in the ink compositions are carbon blacks. Examples of suitable carbon black pigments include, but are not limited to, channel black, furnace black, lamp black, and the like. When additional pigments are included in the ink composition, the pigments are optionally dispersed with a dispersant.

Specific examples of the carbon black that may be added to the ink composition include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600, MCF88 and the like manufactured by Mitsubishi Kagaku K.K.; Monarch® 120, Monarch® 700, Monarch® 800, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R and the like manufactured by Cabot K.K.; Printex® A, Printex® G, Printex® U, Printex® V, Printex® 55, Printex® 140U, Printex® 140V, Special black 4, Special black 4A, Special black 5, Special black 6, Special black 100, Special black 250, Color black FW1, Color black FW2, Color black FW2V, Color black FW18, Color black FW200, Color black S150, Color black S160, Color black S170 and the like manufactured by Degussa K.K.

The stabilizing dyes of the present invention comprise any dye that improves the reliability and performance of a pigmented ink. The reliability and the performance of a pigmented ink may be improved by a reduction in material that blocks a printhead vias and throats as a result of the presence of a binder in the ink. Examples of a stabilizing dye include, but are not limited to, Pro-jet® Fast Black 2 dye (C.I. Direct Black 195), Pro-jet® Fast Cyan 2 dye, Pro-jet® Fast Magenta 2 dye (C.I. Direct Violet 107), Pro-jet® Fast Yellow 2 dye (C.I. Direct Yellow 173), or mixtures thereof. The Pro-jet® dyes are available from Avecia Incorporated. Other examples of stabilizing dyes include various dyes disclosed in U.S. Pat. No. 5,268,459, U.S. Pat. No. 5,296,023, and U.S. Pat. No. 5,262,527, and these dyes may be prepared according to the methods disclosed therein.

In an embodiment, a stabilizing dye may comprise a greater number of $CO_2H$ groups than $SO_3H$ groups. In another embodiment, a stabilizing dye may comprise at least two $CO_2H$ groups. In another embodiment, a stabilizing dye may comprise at least three $CO_2H$ groups. In another embodiment, a stabilizing dye may comprise at least four $CO_2H$ groups. In another embodiment, a stabilizing dye may comprise at least two $CO_2H$ groups and no more than one $SO_3H$ group. In another embodiment, a stabilizing dye may comprise at least two $CO_2H$ groups and no $SO_3H$ group.

In another embodiment, a stabilizing dye may comprise C.I. Direct Black 195, C.I. Direct Violet 107, C.I. Direct Yellow 173, or mixtures thereof.

In another embodiment, a stabilizing dye comprises a dye represented by the formula (1):

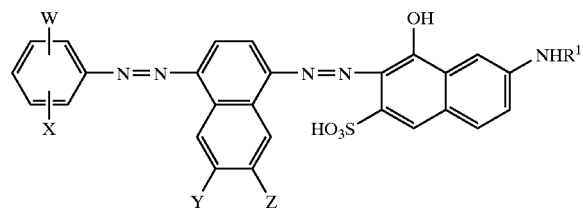

(1)

wherein W comprises —$CO_2H$; X comprises —H, —$CO_2H$, —$SO_3H$, -halo, -nitro, -cyano, —$C_1$-$C_6$-alkyl, —$C_1$-$C_6$-alkoxy, or —$C_1$-$C_6$-acylamino; Y comprises —H, $CO_2H$, or —$SO_3H$; Z comprises —H, —$CO_2H$, or —$SO_3H$; and $R^1$ comprises —H or —$C_1$-$C_4$-alkyl, wherein formula (1) comprises at least two $CO_2H$ groups and the number of $CO_2H$ groups is equal to or greater than the number of $SO_3H$ groups.

In one embodiment, X comprises —H or —$CO_2H$. In embodiments wherein X comprises —H, W may be in the ortho, meta, or para position with respect to the azo group. In embodiments wherein X comprises —$CO_2H$, W and X may be at the 3,4-, 2,5-, and the 3,5-positions of the ring. In preferred embodiments, W and X are in the 3,5-positions.

The dye of formula (1) preferably comprises from 2 to 4 $CO_2H$ groups and preferably not more than two $SO_3H$ groups. In a preferred embodiment, not more than one of X, Y, and Z comprise an $SO_3H$ group. In another preferred embodiment, the number of $CO_2H$ groups exceeds the number of $SO_3H$ groups by at least 1 or 2.

In another embodiment, a stabilizing dye comprises a dye represented by the formula (2):

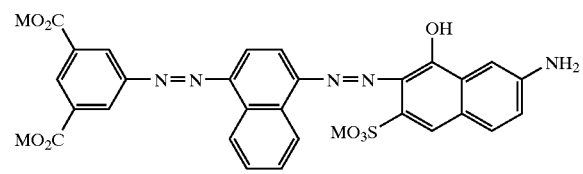

(2)

wherein M comprises —H, —Na, —K, —Li, —$NH_4$, or an organic amine. In an embodiment, M comprises —$NH_4$.

In another embodiment, a stabilizing dye comprises a dye represented by the formula (3):

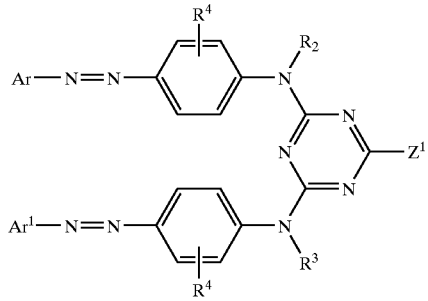

(3)

wherein:
Ar and $Ar^1$ independently comprise aryl or substituted aryl providing at least one of Ar and $Ar^1$ has at least one substituent comprising —$CO_2H$ or COSH;
$R^4$ independently comprises H, alkyl, substituted alkyl, alkoxy, halogen, CN, ureido, or $NHCOR^5$, wherein $R^5$ comprises H, alkyl, substituted alkyl, aryl, substituted aryl, aralkyl or substituted aralkyl;
$R^2$, $R^3$ independently comprise H, alkyl, or substituted alkyl;
$Z^1$ comprises $OR^7$, $SR^7$ or $NR^8R^9$, wherein $R^7$, $R^8$, $R^9$ independently comprise H, alkenyl, substituted alkenyl, alkyl, substituted alkyl, aryl, substituted aryl, aralkyl or substituted aralkyl, or $R^8$ and $R^9$ may be taken together with the nitrogen atom to which they are attached to form a 5 or 6 membered ring;
provided (i) the compound of formula (3) has at least three —$CO_2H$ groups; and (ii) the compound of formula (3) has at least as many —$CO_2H$ groups as —$SO_3H$ groups.

In a preferred embodiment of the compound of formula (3), each of the Ar and $Ar^1$ groups comprises at least one —$CO_2H$ substituent. In other preferred embodiments of the compound of formula (3), each of Ar and $Ar_1$ groups comprises at least two —$CO_2H$ substituents. In more preferred embodiments of the compound of formula (4), each of the Ar and $Ar_1$ groups is a dicarboxyphenyl group. In other preferred embodiments of the compound of formula (3), $Z^1$ comprises —$NHC_2H_4OH$, —$N(C_2H_4OH)_2$, —$NH(C_{1-6}$-alkyl) or morpholino.

In another embodiment, a stabilizing dye comprises a dye represented by the formula (4):

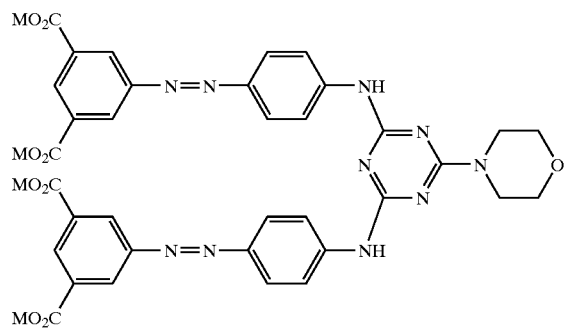

(4)

wherein M comprises —H, —Na, —K, —Li, —$NH_4$, or an organic amine. In an embodiment, M comprises —$NH_4$.

In another embodiment, a stabilizing dye comprises a dye represented by the formula (5):

$Ar^2$—N=N-J-X—$(NR^{10}$-$L^1$-$NR^{11})_n$—X-J-N=N—$Ar^3$ formula (5)

wherein

Ar² and Ar³ independently comprise aryl or substituted aryl providing at least one of Ar² and Ar³ has at least one substituent comprising CO₂H or COSH;
R¹⁰ and R¹¹ independently comprise H, alkyl, substituted alkyl, alkenyl or substituted alkenyl;
J comprises

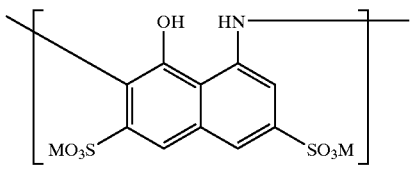

L¹ comprises a divalent organic linking group;
n is 0 or 1;
X comprises a carbonyl group or a group of the formula (6),

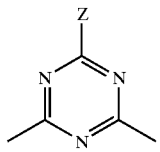

(6)

wherein Z comprises NR¹²R¹³, SR¹⁴ or OR¹⁴, wherein R¹², R¹³, and R¹⁴ independently comprise H, alkyl, substituted alkyl, alkenyl, substituted alkenyl, aryl, substituted aryl, aralkyl, substituted aralkyl, or R¹² and R¹³ together with the nitrogen atom to which they are attached form a 5 or 6 membered ring.

In a preferred embodiment, the compound of formula (5) has at least as many —CO₂H groups as —SO₃H groups. In another preferred embodiment, Ar¹ and Ar² are substituted with substituents independently comprising —CO₂H, —COSH or —SO₃H, especially —CO₂H and that at least one of Ar¹ and Ar² has at least one —CO₂H substituent. In especially preferred structures, each of Ar¹ and Ar² has at least one —CO₂H substituent and more particularly at least two —CO₂H substituents as in, for example, dicarboxyphenyl.

R¹⁰ and R¹¹ preferably comprise H, C₁₋₆-alkyl or substituted C₁₋₆-alkyl. It is preferred that when R¹⁰ or R¹¹ are substituted, the substituents comprise —OH, —CO₂H or —SO₃H.

The identity of the divalent organic linking group L¹ is not critical providing it does not interfere with the performance of the compound. As examples of divalent organic linking groups represented by L¹ there may be mentioned:

(a) divalent aliphatic radicals, preferably those containing from 2 to 6 carbon atoms, such as ethylene, trimethylene, propylene, tetramethylene, alpha:beta-dimethylethylene and hexamethylene radicals;

(b) divalent aromatic homocyclic radicals in which at least one of the terminal links is through an aliphatic carbon atom, for example as in the benzylene —C₆H₄CH₂— or the xylylene —CH₂C₆H₄CH₂— group;

(c) divalent monocyclic or fused polycyclic aromatic radicals, for example of the benzene, naphthalene, anthraquinone or fluorene series, such as 1,3- or 1,4-phenylene; 2-nitro-1,4-phenylene; 3-sulpho-1,4-phenylene; 4-methoxy-1,3-phenylene; 4-sulpho-1,3-phenylene; 4-nitro-1,3-phenylene; 2-carboxy-1,4-phenylene; 2-chloro-1,4-phenylene; 4-carboxy-1,3-phenylene; 3,7-disulpho-1,5-naphthylene; 2-methoxy-1,4-phenylene;

(d) divalent radicals wherein the terminal bonds are attached to carbon atoms of two phenyl or naphthalene nuclei which are joined together either through a direct link or through an atom or chain of atoms which may form a homocyclic or heterocyclic ring. Of this type, there may be mentioned as examples divalent radicals derived from diphenyl, azobenzene, diphenyloxide, diphenyloxadiazole, diphenylamine, benzanilide, diphenylsulphide, diphenylurea, diphenylsulphone, 1,2-bis(phenylcarbamyl)ethylene, diphenylmethane, 1,4-bis-(phenylcarbamyl)butadiene, diphenylketone, 1,2-bis-(phenylcarbamyl)ethane, diphenylethane, 1,3-bis-(phenylcarbamyl)propane, diphenylethylene 2,4-dianilino-s-triazine; and (e) nuclear substituted derivatives of the above, for example, containing COOH, methyl, nitro and/or sulphonic acid and/or chlorine atoms as substituents in the phenyl or naphthalene nuclei.

Alternatively the group NR¹⁰-L²-N—R¹¹ may comprise a piperazine or a substituted piperazine in which the two ring nitrogen atoms are bonded to the groups represented by X.

In another embodiment, a stabilizing dye comprises a dye represented by the formula (7):

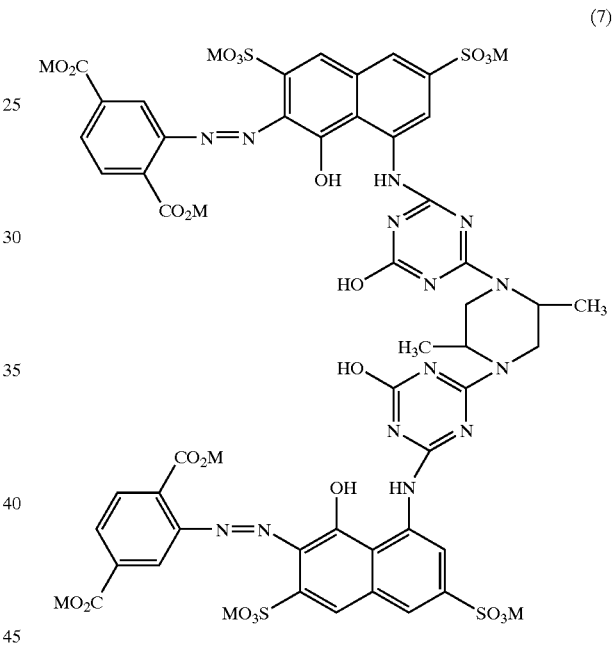

(7)

wherein M comprises —H, —Na, —K, —Li, —NH₄, or an organic amine. In an embodiment, M comprises —NH₄.

In another embodiment, a stabilizing dye comprises a dye represented by the formula (8):

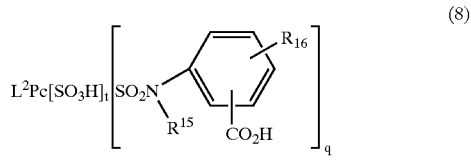

(8)

wherein
L² comprises a metal cation or hydrogen;
Pc comprises a phthalocyanine radical having a valency from 3 to 4;
R¹⁵ comprises H, alkyl, substituted alkyl, alkenyl, substituted alkenyl, aralkyl or substituted aralkyl;
R¹⁶ comprises H, alkyl, alkoxy, halo or an optionally substituted amino group; and
(t+q) is from 3 to 4 inclusive.

In a preferred embodiment of the compound of formula (8), L comprises a nickel or a copper cation. In another preferred embodiment of the compound of formula (8), $R^{15}$ and $R^{16}$ comprise H. In another preferred embodiment, q equals 2 and t equals 1. In another preferred embodiment, q equals 3 and t equals 0. In another preferred embodiment, q equals 3 and t equals 1. In another preferred embodiment, q equals 4 and t equals 0.

In another embodiment, a stabilizing dye comprises a dye represented by the formula (9):

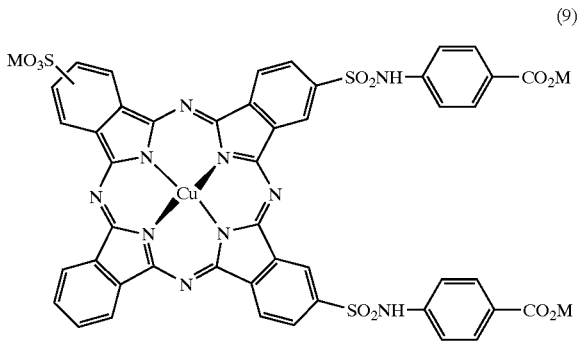

(9)

wherein M comprises —H, —Na, —K, —Li, —$NH_4$, or an organic amine. In an embodiment, M comprises —$NH_4$.

As used herein, the term "alkyl" refers to a straight or branched chain hydrocarbon radical having from one to ten carbon atoms. Examples of "alkyl" as used herein include, but are not limited to, methyl, n-butyl, t-butyl, n-pentyl, isobutyl, isopropyl, and the like.

As used herein, the term "alkenyl" refers to a straight or branched chain hydrocarbon radical having from two to ten carbons and at least one carbon-carbon double bond.

As used herein, the term "aryl" refers to a benzene ring or a benzene ring system fused to one or more benzene rings. Examples of aryl include, but are not limited to, phenyl, 2-naphthyl, 1-naphthyl, 1-anthracenyl, and the like.

As used herein, the term "aralkyl" refers to an aryl system connected to an alkyl group.

As used herein, the term "alkoxy" refers to the group $R_aO$—, where $R_a$ comprises an alkyl group.

As used herein, the term "acyl" refers to the group $R_aC(O)$—, where $R_a$ comprises an alkyl, alkenyl, or aryl group.

As used herein, the term "halogen" or "halo" shall include iodine, bromine, chlorine and fluorine.

As used herein, the terms "substituted alkyl" and "substituted alkenyl" refer to substitution with a group comprising —$CH_3$, —OH, —$OCH_3$, —$CO_2H$, or —$SO_3H$, with multiple degrees of substitution being allowed unless otherwise stated.

As used herein, the terms "substituted aryl" and "substituted aralkyl" refer to substitution of the aryl ring with a group comprising -alkyl, -substituted alkyl, -alkoxy, —OH, —$CO_2H$, —$SO_3H$, $PO_3H_2$, —COSH, or halogen, with multiple degrees of substitution being allowed unless otherwise stated.

As used herein, the hydrogens of groups —$CO_2H$, —$SO_3H$, $PO_3H_2$, and —COSH on a stabilizing dye are understood to be interchangable with Na, K, Li, $NH_4$, or an organic amine unless otherwise stated.

As used herein, the term "substituted amino" refers to substitution with a group comprising alkyl, substituted alkyl, aryl, or substituted aryl, with multiple degrees of substitution being allowed unless otherwise stated.

As used herein, the term "organic amine" refers to a positively charged amino group comprising one to four alkyl, substituted alkyl, aryl, or substituted aryl groups.

As used herein, the term "optionally" means that the subsequently described event(s) may or may not occur, and includes both event(s) which occur and events that do not occur.

Designated numbers of carbon atoms (e.g. $C_1$–$C_{10}$) shall refer independently to the number of carbon atoms in an alkyl or alkenyl moiety.

There is essentially no limitation to the additional dyes which may be employed in the ink composition of the present invention, so long as the reliability and the performance of the ink is preserved.

The binder included in the ink compositions of the present invention typically comprises an emulsion of acrylic resin, methacrylic resin, styrene resin, urethane resin, acrylamide resin, epoxy resin, or a mixture of these resins. The resin is not limited by copolymerization methods and may be, for example, a block copolymer, a random copolymer or the like. Further, preferably, the binder used in the ink composition of the present invention has a film forming property. The water-soluble emulsion may comprise a core surrounded by a shell.

Examples of monomers for the binders include: styrene, acrylic acid, methacrylic acid, alkyl acrylates, and alkyl methacrylates. Specific examples of styrene, alkyl acrylate, and alkyl methacrylate monomer derivatives include butyl acrylate, ($\alpha$, 2, 3 or 4)-alkylstyrenes, ($\alpha$, 2, 3 or 4)-alkoxystyrenes, 3,4-dimethylstyrene, $\alpha$-phenylstyrene, divinylbenzene, vinylnaphthalene, dimethylamino (meth) acrylate, dimethylaminoethyl (meth)acrylate, dimethylaminopropyl acrylamide, N,N-dimethyl acrylamide, N-isopropyl acrylamide, N,N-diethyl acrylamide, methyl (meth)acrylate, ethyl (meth)acrylate, propyl (meth)acrylate, ethyl-hexyl (meth)acrylate, the other alkyl (meth)acrylates, methoxy-diethylene glycol (meth)acrylate, ethoxy-, propoxy- or butoxy-diethylene glycol or polyethylene glycol (meth)acrylates, cyclohexyl (meth)acrylate, benzyl (meth) acrylate, phenoxyethyl (meth)acrylate, isobornyl (meth) acrylate, hydroxyalkyl (meth)acrylates, fluorine-, chlorine- or silicon-containing (meth)acrylates, (meth)acrylamide, maleic acid amide, dimethylaminoethyl acrylate, methyl acrylate, ethyl acrylate, propyl acrylate, ethyl-hexyl acrylate, methoxy-diethylene glycol acrylate, ethoxy-, propoxy- or butoxy-diethylene glycol or polyethylene glycol acrylates, cyclohexyl acrylate, benzyl acrylate, phenoxyethyl acrylate, isobornyl acrylate, hydroxyalkyl acrylates, fluorine-, chlorine- or silicon-containing acrylates, and acrylamide.

In an embodiment, the binder comprises a latex polymer comprising the monomer units methyl methacrylate, butylacrylate, and methacrylic acid. In another embodiment, the binder has a molecular weight between 150,000 and 300,000. In another embodiment, the binder comprises a latex polyer comprising the monomer units methyl methacrylate, butylacrylate, and methacrylic acid, wherein the amount of methacrylic acid ranges from about 0.5% to about 10%.

The dispersants useful in this invention are generally not limited and include any of those capable of dispersing pigments. The dispersants typically comprise hydrophobic and hydrophilic polymeric segments. The hydrophobic segment tends to interact with the pigment particle in the ink compositions and the hydrophilic segment tends to be solvated by the aqueous medium thereby dispersing the pigment.

Illustrative examples of the dispersants which may be employed in the ink compositions of invention include AB, BAB and ABC block copolymers known in the art. Preferred AB and BAB block copolymers include those, for example, which comprise hydrophobic and hydrophilic segments derived from acrylic monomers. Another illustrative example of dispersants includes random polymers.

A preferred class of dispersants which may be employed in the present invention include block and/or graft co- or terpolymers comprising a hydrophilic polymeric segment, and one or two hydrophobic polymeric segment(s) having a hydrolytically stable siloxyl substituent or a hydrophobic amide side chain. A particularly preferred subgroup of these dispersants are graft terpolymers which comprise a hydrophilic polymeric segment (particularly an acrylic or methacrylic acid co- or terpolymer) together with a hydrophobic polymeric segment derived from a polyorganosiloxane as described in U.S. Pat. Nos. 5,719,204 and 5,714,538.

In an embodiment, the polymeric dispersant comprises a hydrophilic polymeric segment and a hydrophobic polymeric segment, having a number average molecular weight of from about 400 to about 3,000, prepared from members selected from the group consisting of reactive surfactant macromers, protective colloid macromers, and non-siloxyl containing hydrophobic monomers. In a preferred embodiment, the hydrophilic polymeric segment of the copolymer is an acrylate or methacrylate polymer and the hydrophobic polymeric segment of the copolymer is an acryloyl- or methacryloyl-terminated polydialkylsiloxane macromer. In another preferred embodiment, the hydrophobic segment of the copolymer comprises stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from about 1 to about 40; nonylphenoxy poly(ethyleneoxy)$_n$ acrylate, wherein n is from about 1 to about 40; methoxypoly(ethyleneoxy)$_n$ methacrylate, wherein n is from about 5 to about 40; methyloxypoly(ethyleneoxy)$_n$ acrylate, wherein n is from about 5 to about 40; stearyloxypoly (ethyleneoxy)$_n$ methacrylate, wherein n is from about 1 to about 20; stearyloxypoly(ethyleneoxy)$_n$ acrylate, wherein n is from about 1 to about 20; fluorinated $C_1$–$C_{18}$ alkyl methacrylate; fluorinated $C_1$–$C_{18}$ alkyl acrylate; poly (propylene glycol) methyl ether methacrylate; poly (propylene glycol) methyl ether acrylate; poly(propylene glycol) 4-nonylphenol ether methacrylate; poly(propylene glycol) 4-nonylphenol ether acrylate; methacryloxy-trimethylsiloxy-terminated polyethylene oxide; acryloxy-trimethylsiloxy-terminated polyethylene oxide, and mixtures thereof.

Humectants that may be employed in this invention are generally not limited and are known in the art. Illustrative examples include alkylene glycols, polyols, diols, bis-hydroxy terminated thioethers, and lactams.

The alkylene glycols useful as humectants generally have a molecular weight of from about 50 to about 4,000, preferably from about 50 to about 2,000, more preferably from about 50 to about 1,000, even more preferably from about 50 to about 500. Suitable polyalkylene glycols include polyethylene glycol, polyproylene glycol and PEG-co-PPG. In one embodiment, the humectant comprises polyethylene glycol with a molecular weight of 400. In another embodiment, the humectant comprises propylene glycol.

Polyols useful as humectants generally contain at least 2 hydroxyl groups. Suitable triols include glycerol, trimethylol propane, trimethylol ethane, 1,2,4-butanetriol and 1,2,6-hexanetriol. Suitable tetrols include pentaerythritol, di-(trimethylol propane), and methyl glucosides, while glucose is a suitable pentol. Suitable hexols include sorbitol, dipentaerythritol and inositol. A preferred polyol is propylene glycol.

Suitable bis-hydroxy terminated thioethers have the formula:

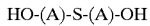

wherein each A is independently an aryl group or $(CR_2)_x$, and each R is independently a hydrogen, a $C_{1-6}$ alkyl group, aryl group or a halogen, and x is an integer from about 1 to about 7. Preferred bis-hydroxy terminated thioethers include 2,2'-thiodiethanol and bis-propanol thioether.

As used here, "lactams" is intended to include cyclic amide compounds such as cyclic amides, substituted cyclic amides and cyclic amide derivatives. Suitable lactams include pyrrolidone compounds, valerolactam compounds, caprolactam compounds, imidazolidinone compounds and oxazolidinone compounds. The cyclic amide compound may comprise 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, 1-methyl-2-piperidone, valerolactam, 1-ethyl valerolactam, caprolactam, 1-methylcaprolactam, oenantholactam, and mixtures thereof. Suitable imidazolidinone compounds include 1,3-dimethyl-2-imidazolidinone. A preferred lactam is 2-pyrrolidone.

The amount of humectant in the ink composition may range from about 0.1 to about 30% by weight. In an embodiment, the amount of humectant ranges from about 0.5 to about 20% by weight. In another embodiment, the amount of humectant ranges from about 1 to about 20% by weight.

Penetrants that may be employed in this invention are generally not limited and include hydroxy substituted hydrocarbons like 1,2-alkyl diols such as 1,2-pentanediol, 1,2-hexanediol and mixtures thereof. A more detailed description of such penetrants may be found in U.S. Pat. No. 5,364,461.

Additional examples of penetrants include: alkyl alcohols having 1 to 4 carbon atoms, such as ethanol, methanol, butanol, propanol and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol-mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; formamide; acetamide; dimethylsulfoxide; sorbitol; sorbitan; acetin; diacetin; triacetin; and sulfolane. A preferred penetrant is 1,2-hexanediol.

The amount of penetrant in the ink composition may range from about 0.01 to about 20% by weight. In an embodiment, the amount of penetrant ranges from 0.1 to 10% by weight. In another embodiment, the amount of penetrant ranges from about 0.5 to about 5% by weight.

The aqueous vehicle used in the ink compositions comprises water. The aqueous vehicle may further comprise a second solvent such as an organic solvent which is miscible with water. Selection of a suitable water miscible solvent depends on the requirements of the specific aqueous ink being formulated, such as the desired surface tension and viscosity, the pigment being used, the drying time required for the pigmented ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or keto alcohols, such as acetone, methyl ethyl ketone, and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful solvents include lactones and lactams.

When the aqueous vehicle comprises a miscible mixture of water and an organic solvent, the mixtures usually comprise greater than about 25% by weight water to about 99.9% by weight water based on total weight of the mixture. The preferred weight percent of water employed is about 50% to about 99.9% based on total weight of the mixture.

Other additives, such as biocides, viscosity modifiers, anti-kogation agents, anti-curling agents, chelating agents, anti-bleed agents, and buffers may be added to the ink composition at their art established levels.

The biocides which may be employed are known and commercially available. They prevent growth of microorganisms in the ink. Examples of biocides that are suitable for use in this invention include those, for instance, which comprise benz-isothiazolin-one, methyl-isothiazolin-one and chloro-methyl-isothiazolin-one. A preferred biocide includes, but is not limited to, Proxel® GXL (Zeneca).

Suitable chelating agents include sodium ethylene diamine tetraacetate, sodium nitrilotriacetate, sodium hydroxyethyl ethylene diamine triacetate and sodium diethylene triamine pentaacetate.

The ink composition of the present invention may be prepared by any method known in the art for making such compositions. For example, the self-dispersing carbon black or other additional pigments may be milled in a horizontal mill or attritor to reduce the particle size to an acceptable level. A dispersant may be included in the grind process, for example if a pigment other than the self-dispersing carbon black is used in the ink composition. The ground material is then blended with the other ink components. When used in various ink jet printheads, the ink composition may have a viscosity of less than 5 cps at 25° C.

The average size of particle in the ink composition of the present invention is generally less than or equal to 1 micron. In an embodiment, the average particle size of the ink composition is less than or equal 0.3 microns. In another embodiment, the average particle size of the ink composition is between about 0.05 microns and about 0.3 microns.

The following examples are detailed descriptions of methods of preparation and use of the inks and the ink system of the present invention. The detailed descriptions fall within the scope of, and serve to exemplify, the more general description set forth above. These examples are presented for illustrative purposes only, and not intended as a restriction on the scope of the invention.

EXAMPLES

Example 1

Comparative Ink

A comparative ink formulation with the ingredients listed in Table 1 was prepared according to the following procedure.

TABLE 1

| Comparative Ink Formulation | |
|---|---|
| Ingredient | % w/w |
| Monarch ® 880 | 1.33 |
| Self-dispersing carbon black | 2.67 |
| Polyethylene glycol (MW 400) | 5 |
| 2-Pyrrolidone | 5 |
| Propylene glycol | 5 |
| 1,2-Hexanediol | 2.6 |
| Butyl acrylate/methyl methacrylate/acrylic acid binder | 2 |
| Water | balance |

The ink formulation was prepared by mixing polyethylene glycol with a molecular weight of 400, 2-pyrrolidone, propylene glycol, 1,2-hexanediol, and Acryjet® 3666 (Butyl acrylate/methyl methacrylate/1.3% acrylic acid binder). The mixture was stirred for approximately 10 minutes. A concentrate containing deionized water, carbon black pigment and an acrylic terpolymer dispersant was prepared and added to the first mixture while stirring. The acrylic terpolymer was made by polymerizing methacrylic acid, stearyl methacrylate and dimethyl siloxane according to U.S. Pat. No. 5,714,538. The final ink component was a self-dispersing carbon black. The self-dispersed carbon black was a sterically modified, oxidized carbon black made by reacting the carbon black with sodium hypochlorite (0.4 to 5.25 parts hypochlorite per part carbon black by weight) in an aqueous medium as described in U.S. Pat. No. 3,347,632. The raw material for making the self-dispersing carbon black was Monarch® 880 from Cabot Corporation of Billerica, Mass. The self-dispersing carbon black concentrate was added to the ink and mixed for 20 minutes. The ink was filtered through a series of filters with the final filter being 1.2 microns.

Example 2

An ink formulation according to the present invention with the ingredients listed in Table 2 was prepared according to the following procedure.

TABLE 2

Ink Formulation

| Ingredient | % w/w |
|---|---|
| Monarch ® 880 | 1.33 |
| Self-dispersing carbon black | 2.67 |
| Polyethylene glycol | 5 |
| 2-Pyrrolidone | 5 |
| Propylene Glycol | 5 |
| 1,2-Hexanediol | 2.6 |
| Butyl acrylate/methyl methacrylate/acrylic acid binder | 2 |
| Pro-jet ® Fast Black 2 dye | 0.5 |
| Water | balance |

The ink formulation was prepared by initially mixing deionized water and Pro-jet® Fast Black 2 dye (C.I. Direct Black 195) together for approximately 10 minutes. Polyethylene glycol with a molecular weight of 400, 2-pyrrolidone, propylene glycol, 1,2-hexanediol and Acryjet® 3666 (Butyl acrylate/methyl methacrylate/1.3% acrylic acid binder) was then added to the dye mixture and stirred for approximately 10 minutes. A concentrate containing deionized water, carbon black pigment and an acrylic terpolymer dispersant was prepared and added to the first mixture while stirring. The acrylic terpolymer was made by polymerizing methacrylic acid, stearyl methacrylate and dimethyl siloxane according to U.S. Pat. No. 5,714,538. The final ink component was a self-dispersing carbon black. The self-dispersing carbon black was a sterically modified, oxidized carbon black made by reacting the carbon black with sodium hypochlorite (0.4 to 5.25 parts hypochlorite per part carbon black by weight) in an aqueous medium as described in U.S. Pat. No. 3,347,632. The raw material for making the self-dispersing carbon black was Monarch® 880 from Cabot Corporation of Billerica, Mass. The self-dispersing carbon black concentrate was added to the ink and mixed for 20 minutes. The ink was filtered through a series of filters with the final filter being 1.2 microns.

Example 3

An ink formulation according to the present invention was prepared according to the procedure described in Example 2, except that Pro-jet® Fast Cyan 2 dye was used instead of Pro-jet® Fast Black 2 dye.

Example 4

An ink formulation according to the present invention was prepared according to the procedure described in Example 2, except that Pro-jet® Fast Yellow 2 dye (C.I. Direct Yellow 173) was used instead of Pro-jet® Fast Black 2 dye.

Example 5

The reliability of the ink composition in Example 2 in comparison to the ink composition in Example 1 was tested. The text file used to determine reliability was printed on a Lexmark® Z51 printer. This text file is designed to deplete the printhead of the majority of its ink, simulating the entire life of the printed head, as used by an individual.

The text file comprised ninety pages of several different print files that varied in the amount of ink jetted per page. At the end of the text file, the number of nozzles not firing correctly was determined. Table 3 lists the results of a reliability test performed where each entry represents the number of nozzles on each cartridge not firing correctly at the end of the test.

TABLE 3

Nozzles missing at end of printhead life

| | Ink | | | | |
|---|---|---|---|---|---|
| | Cartridge 1 | Cartridge 2 | Cartridge 3 | Cartridge 4 | Cartridge 5 |
| Ex. 1 | 33 | 21 | 39 | 22 | 21 |
| Ex. 2 (Black) | 0 | 2 | 1 | 2 | 0 |

The results of the tests demonstrate that Pro-jet® Fast Black 2 improves the reliability of the ink and that cartridges containing an ink as described in Example 2 have fewer missing nozzles and misfiring nozzles at the end of the printhead life.

A separate reliability test for the inks in Examples 2, 3, and 4 was run following the same test procedure described above. Table 4 lists the results of the reliability tests.

TABLE 4

Nozzles missing at end of printhead life

| | Ink | |
|---|---|---|
| | Cartridge 1 | Cartridge 2 |
| Ex. 1 | 36 | 34 |
| Ex. 2 (Black) | 0 | 0 |
| Ex. 3 (Cyan) | 0 | 0 |
| Ex. 4 (Yellow) | 1 | 0 |

The results of the second set of tests demonstrate that Pro-jet® Fast Black 2, Fast Cyan 2, and Fast Yellow 2 dyes similarly improve the reliability of the ink relative to the comparative ink and that cartridges containing an ink as described in Examples 2, 3, and 4 have fewer missing nozzles and misfiring nozzles at the end of the printhead life.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An ink composition comprising:

a self-dispersing carbon-black;

a binder;

a stabilizing dye comprising at least as many groups comprising $CO_2H$ or $COSH$ as groups comprising $SO_3H$ and operable to improve the reliability of the ink composition when used in an ink jet head; and an aqueous vehicle.

2. The ink composition of claim 1, wherein the self-dispersing carbon black has been oxidized to form carboxylate functional groups on the surface of the carbon black.

3. The ink composition of claim 1, wherein the amount of self-dispersing carbon black in the ink composition ranges from about 0.1 to about 20.0% by weight.

4. The ink composition of claim 1, wherein the self-dispersing carbon black has an oxygen content of less than or equal to 10% by weight.

5. The ink composition of claim 1, wherein the amount of binder included in the ink composition ranges about 0.1 to about 10% by weight.

6. The ink composition of claim 1, wherein the binder comprises a latex polymer.

7. The ink composition of claim 6, wherein the binder comprises a latex polymer comprising the monomer units methyl methacrylate, butylacrylate, and methacrylic acid.

8. The ink composition of claim 6, wherein the binder has a molecular weight between 150,000 to 300,000.

9. The ink composition of claim 1, further comprising a humectant, a penetrant, a biocide, and combinations thereof.

10. The ink composition of claim 1, further comprising a pigmented dispersion comprising a pigment and a polymeric dispersant.

11. The ink composition of claim 10, wherein the pigmented dispersion comprises carbon black.

12. The ink composition of claim 10, wherein the polymeric dispersant comprises a hydrophilic polymeric segment and a hydrophobic polymeric segment.

13. The ink composition of claim 1, wherein the pH of the ink composition is greater than or equal to 7.

14. The ink composition of claim 1, wherein the ratio of self-dispersing carbon black to stabilizing dye is from about 20:1 to about 1:1.

15. The ink composition of claim 1, wherein the amount of the stabilizing dye in the ink composition ranges from about 0.1 to about 10% by weight.

16. The ink composition of claim 1, wherein the stabilizing dye comprises a greater number of $CO_2H$ groups than $SO_3H$ groups.

17. The ink composition of claim 1, wherein the stabilizing dye comprises at least two $CO_2H$ groups.

18. The ink composition of claim 1, wherein the stabilizing dye comprises at least three $CO_2H$ groups.

19. The ink composition of claim 1, wherein the stabilizing dye comprises at least four $CO_2H$ groups.

20. The ink composition of claim 1, wherein the stabilizing dye comprises at least two $CO_2H$ groups and no more than one $SO_3H$ group.

21. The ink composition of claim 1, wherein the stabilizing dye comprises at least two $CO_2H$ groups and no $SO_3H$ group.

22. The ink composition of claim 1, wherein the stabilizing dye comprises a dye represented by the formula (1):

wherein

W comprises —$CO_2H$;

X comprises —H, —$CO_2H$, —$SO_3H$, -halo, -nitro, -cyano, —$C_1$–$C_6$-alkyl, —$C_1$–$C_6$-alkoxy, or —$C_1$–$C_6$-acylamino;

Y comprises —H, $CO_2H$, or —$SO_3H$;

Z comprises —H, —$CO_2H$, or —$SO_3H$; and $R^1$ comprises —H or —$C_1$–$C_4$-alkyl, wherein formula (1) comprises at least two $CO_2H$ groups and the number of $CO_2H$ groups is equal to or greater than the number of $SO_3H$ groups.

23. The ink composition of claim 22, wherein the stabilizing dye comprises a dye represented by the formula (2):

wherein M comprises —H, —Na, —K, —Li, —$NH_4$, or an organic amine.

24. The ink composition of claim 1, wherein the stabilizing dye comprises a dye represented by the formula (3):

wherein:

Ar and $Ar^1$ independently comprise aryl or substituted aryl providing at least one of Ar and $Ar^1$ has at least one substituent comprising —$CO_2H$ or COSH;

R[4] independently comprises H, alkyl, substituted alkyl, alkoxy, halogen, CN, ureido, or NHCOR[5], wherein R[5] comprises H, alkyl, substituted alkyl, aryl, substituted aryl, aralkyl or substituted aralkyl;

R[2], R[3] independently comprise H, alkyl, or substituted alkyl;

Z[1] comprises OR[7], SR[7] or NR[8]R[9], wherein R[7], R[8], R[9] independently comprise H, alkenyl, substituted alkenyl, alkyl, substituted alkyl, aryl, substituted aryl, aralkyl or substituted aralkyl, or R[8] and R[9] may be taken together with the nitrogen atom to which they are attached form a 5 or 6 membered ring;

provided (i) the compound of formula (3) has at least three —CO$_2$H groups; and (ii) the compound of formula (3) has at least as many —CO$_2$H groups as —SO$_3$H groups.

25. The ink composition of claim 24, wherein the stabilizing dye comprises dye represented by the formula (4):

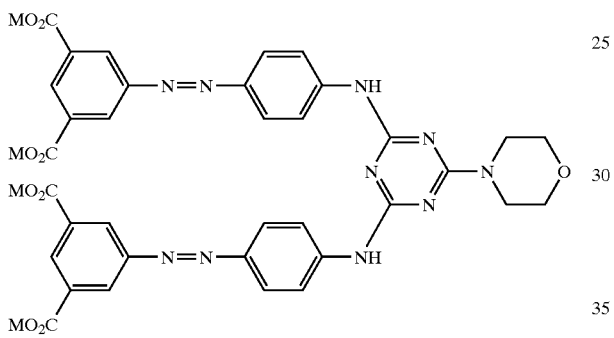
(4)

wherein M comprises —H, —Na, —K, —Li, —NH$_4$, or an organic amine.

26. The ink composition of claim 1, wherein the stabilizing dye comprises a dye represented by the formula (5):

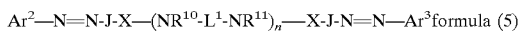

Ar[2]—N=N-J-X—(NR[10]-L[1]-NR[11])$_n$—X-J-N=N—Ar[3]  formula (5)

wherein

Ar[2] and Ar[3] independently comprise aryl or substituted aryl providing at least one of Ar[2] and Ar[3] has at least one substituent comprising CO$_2$H or COSH;

R[10] and R[11] independently comprise H, alkyl, substituted alkyl, alkenyl or substituted alkenyl;

J comprises

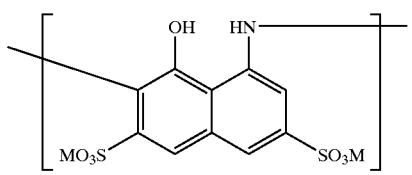

L[1] comprises a divalent organic linking group;
n is 0 or 1;
X comprises a carbonyl group or a group of the formula (6),

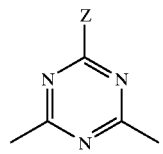
(6)

wherein Z comprises NR[12]R[13], SR[14] or OR[14], wherein R[12], R[13], and R[14] independently comprise H, alkyl, substituted alkyl, alkenyl, substituted alkenyl, aryl, substituted aryl, aralkyl, substituted aralkyl, or R[12] and R[13] together with the nitrogen atom to which they are attached form a 5 or 6 membered ring.

27. The ink composition of claim 26, wherein n is equals 1 and the group —NR[10]-L[1]-NR[11] of formula (3) together comprise a piperazine or a substituted piperazine in which the two ring nitrogen atoms are bonded to the groups represented by X.

28. The ink composition of claim 26, wherein the stabilizing dye comprises a dye represented by the formula (7):

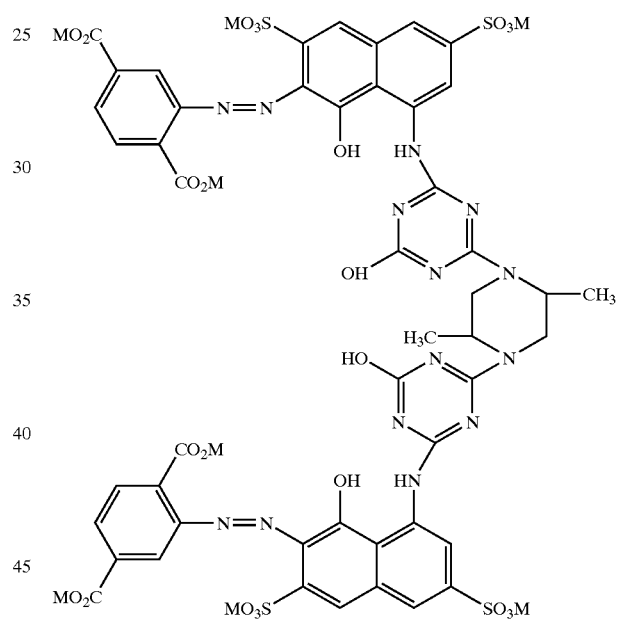
(7)

wherein M comprises —H, —Na, —K, —Li, —NH$_4$, or an organic amine.

29. The ink composition of claim 1, wherein the stabilizing dye comprises a dye represented by the formula (8):

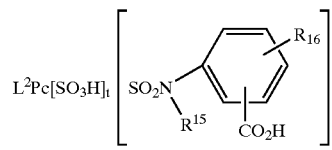
(8)

wherein
L[2] comprises a metal cation or hydrogen;
Pc comprises a phthalocyanine radical having a valency from 3 to 4;
R[15] comprises H, alkyl, substituted alkyl, alkenyl, substituted alkenyl, aralkyl or substituted aralkyl;

$R^{16}$ comprises H, alkyl, alkoxy, halo or an optionally substituted amino group; and (t+q) is from 3 to 4 inclusive.

30. The ink composition of claim 29, wherein the stabilizing dye comprises a dye represented by the formula (9):

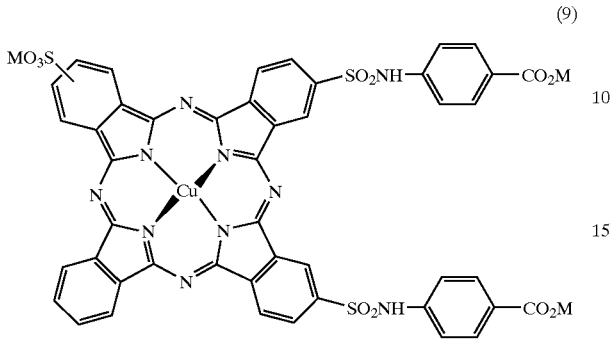

(9)

wherein M comprises —H, —Na, —K, —Li, —NH$_4$, or an organic amine.

31. An ink composition comprising:
a self-dispersing carbon-black;
a binder comprising a latex polymer having a molecular weight between 150,000 and 300,000;
a stabilizing dye comprising at least as many groups comprising CO$_2$H or COSH as groups comprising SO$_3$H; and
an aqueous vehicle.

32. An ink composition comprising:
a self dispersing carbon black;
a binder;
a stabilizing dye comprising at least three CO$_2$H groups; and
an aqueous vehicle.

33. An ink composition comprising:
a self dispersing carbon black;
a binder;
a stabilizing dye comprising at least four CO$_2$H groups; and
an aqueous vehicle.

34. An ink composition comprising:
a self dispersing carbon black;
a binder;
a stabilizing dye comprising a dye represented by the formula (3):

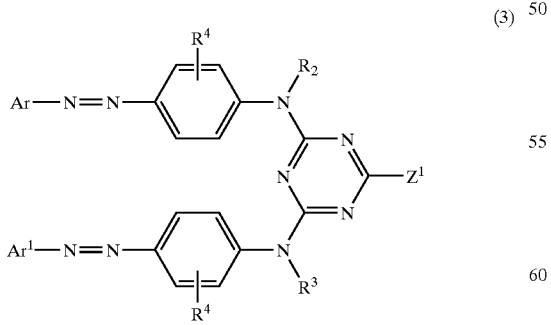

(3)

wherein:

Ar and $Ar^1$ independently comprise aryl or substituted aryl providing at least one of Ar and $Ar^1$ has at least one substituent comprising —CO$_2$H or COSH;

$R^4$ independently comprises H, alkyl, substituted alkyl, alkoxy, halogen, CN, ureido, or NHCOR$^5$, wherein $R^5$ comprises H, alkyl, substituted alkyl, aryl, substituted aryl, aralkyl or substituted aralkyl;

$R^2$, $R^3$ independently comprise H, alkyl, or substituted alkyl;

$Z^1$ comprises OR$^7$, SR$^7$ or NR$^8$R$^9$, wherein $R^7$, $R^8$, $R^9$ independently comprise H, alkenyl, substituted alkenyl, alkyl, substituted alkyl, aryl, substituted aryl, aralkyl or substituted aralkyl, or $R^8$ and $R^9$ may be taken together with the nitrogen atom to which they are attached form a 5 or 6 membered ring;

provided (i) the compound of formula (3) has at least three —CO$_2$H groups; and (ii) the compound of formula (3) has at least as many —CO$_2$H groups as —SO$_3$H groups; and an aqueous vehicle.

35. The ink composition of claim 34, wherein the stabilizing dye comprises a dye represented by the formula (4):

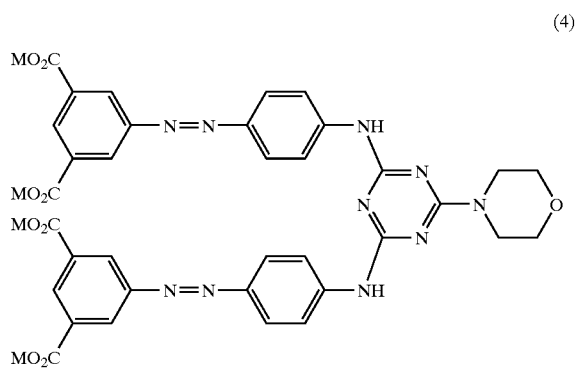

(4)

wherein M comprises —H, —Na, —K, —Li, —NH$_4$, or an organic amine.

36. An ink composition comprising:
a self-dispersing carbon black;
a binder;
a stabilizing dye comprising a dye represented by the formula (5):

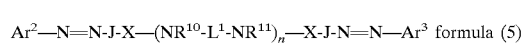

$Ar^2$—N=N-J-X—(NR$^{10}$-L$^1$-NR$^{11}$)$_n$—X-J-N=N—Ar$^3$    formula (5)

wherein $Ar^2$ and $Ar^3$ independently comprise aryl or substituted aryl providing at least one of $A^2$ and $Ar^3$ has at least one substituent comprising CO$_2$H or COSH;

$R^{10}$ and $R^{11}$ independently comprise H, alkyl, substituted alkyl, alkenyl or substituted alkenyl;

J comprises

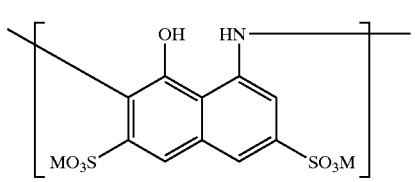

$L^1$ comprises a divalent organic linking group;

n is 0 or 1;

X comprises a carbonyl group or a group of the formula (6), wherein Z comprises $NR^{12}R^{13}$, $SR^{14}$ or $OR^{14}$, wherein $R^{12}$, $R^{13}$, and $R^{14}$ independently comprise H, alkyl, substituted alkyl, alkenyl, substituted alkenyl, aryl, substituted aryl, aralkyl, substituted aralkyl, or $R^{12}$ and $R^{13}$ together with the nitrogen atom to which they are attached form a 5 or 6 membered ring; and an aqueous vehicle.

37. The ink composition of claim 36, wherein n equals 1 and the group $—NR^{10}-L^1-NR^{11}—$ of formula (3) together comprise a piperazine or a substituted piperazine in which the two ring nitrogen atoms are bonded to the groups represented by X.

38. The ink composition of claim 36, wherein the stabilizing dye comprises a dye represented by the formula (7):

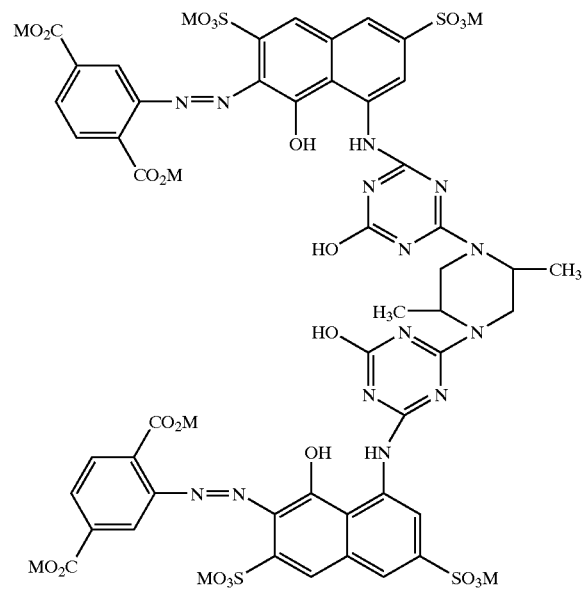

(7)

wherein M comprises —H, —Na, —K, —Li, —NH$_4$, or an organic amine.

39. An ink composition comprising:
a self-dispersing carbon black;
a binder;
a stabilizing dye comprising a dye represented by the formula (8):

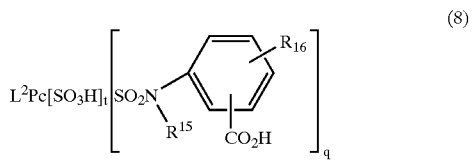

(8)

wherein $L^2$ comprises a metal cation or hydrogen;

Pc comprises a phthalocyanine radical having a valency from 3 to 4;

$R^{15}$ comprises H, alkyl, substituted alkyl, alkenyl, substituted alkenyl, aralkyl or substituted aralkyl;

$R^{16}$ comprises H, alkyl, alkoxy, halo or an optionally substituted amino group; and (t+q) is from 3 to 4 inclusive; and an aqueous vehicle.

40. The ink composition of claim 39, wherein the stabilizing dye comprises a dye represented by the formula (9):

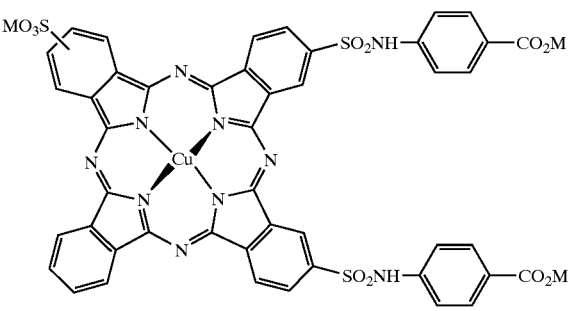

(9)

wherein M comprises —H, —Na, —K, —Li, —NH$_4$, or an organic amine.

* * * * *

UNITED STATES PATENT AND TRADEMARK OFFICE
CERTIFICATE OF CORRECTION

PATENT NO.    : 6,863,719 B2
DATED         : March 8, 2005
INVENTOR(S)   : Susan Butler et al.

It is certified that error appears in the above-identified patent and that said Letters Patent is hereby corrected as shown below:

Column 22,
Line 68, please add the following:

(6)

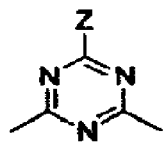

Signed and Sealed this

Twenty-fourth Day of May, 2005

JON W. DUDAS
*Director of the United States Patent and Trademark Office*